Nov. 14, 1961     A. N. MILSTER     3,008,781
SEALING CUP
Filed Feb. 3, 1960
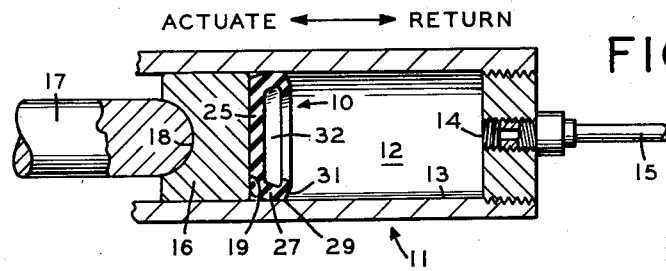
FIG. 1
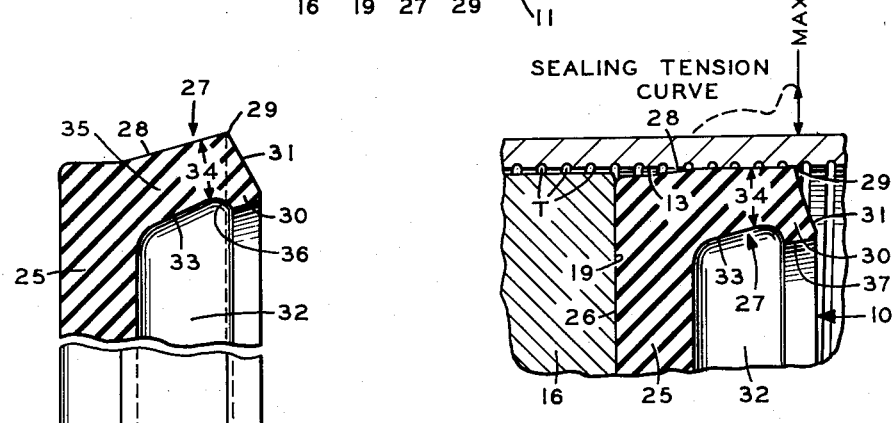
FIG. 2
FIG. 3
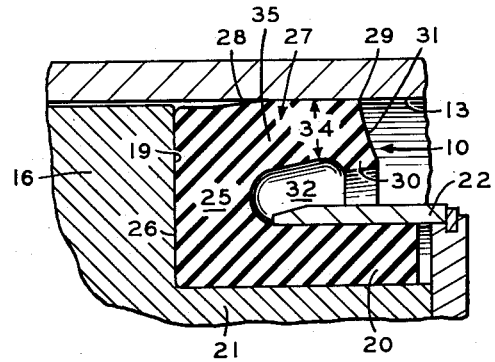
FIG. 4
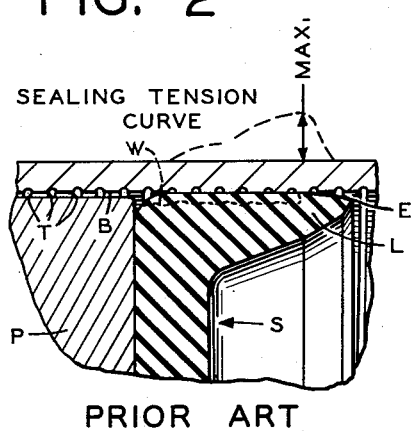
PRIOR ART
FIG. 5
*INVENTOR.*
ARTHUR N. MILSTER
BY
Gravely, Lieder & Woodruff
ATTORNEYS United States Patent Office 3,008,781
Patented Nov. 14, 1961

3,008,781
SEALING CUP
Arthur N. Milster, Richmond Heights, Mo., assignor to Wagner Electric Corporation, St. Louis, Mo., a corporation of Delaware
Filed Feb. 3, 1960, Ser. No. 6,558
16 Claims. (Cl. 309—23)

This invention relates to sealing cups and more particularly to flexible sealing cups for hydraulic mechanisms.

The term "cavitation" as used herein shall be defined as the formation and collapse of bubbles in a hydraulic device at points in a liquid where local pressures become equal to or fall below the vapor pressure of the liquid, the condition existing by reason of or incidental to the reciprocation of a piston member in the hydraulic device.

It is well known that sealing cups used with piston or like reciprocating members in hydraulic devices become eroded and worn in relatively short periods of time thereby causing leakage of hydraulic fluid or failure of the hydraulic device. This problem has been approached in many different ways and many sealing cup constructions have been proposed. However, in spite of knowledge of sealing cup erosion, sealing cups have been designed primarily for sealing function during pressure fluid actuation and without regard to the effective sealing life thereof.

Visual observation of sealing cup operation under stroking conditions in a hydraulic system and under high magnification has shown that a typical piston actuated in one direction of reciprocation to produce work through hydraulic fluid displacement from a master cylinder acting on the piston and followed by piston retraction in a normal return stroke creates a bubble formation in association with the lips or outer sealing surfaces of typical sealing cups and extending toward the piston. Inasmuch as the bubble formations originated and existed only in the sealing area, cavitation cannot be attributed to air penetration. The formation and collapse of bubbles or globules at locations in hydraulic fluid whree the local pressure becomes equal to, or falls below, the vapor pressure of the fluid produces mechanical erosion by forces believed to be in the range of 30,000 to 50,000 p.s.i. Accordidngly, stress concentrations are produced which are high enough to eventually break down metals, plastics and concrete as well as rubber and like resilient materials from which sealing cups are made and, once pitting starts, erosion continues at an accelerated rate.

It has been discovered that the degree of cavitation has a relationship to the length and shape of the sealing cup and cup lip and that bubble formations occur in axial rows or streaks at times close enough together as to form a solid sheet or ring, but that cavitation does not occur to any appreciable extent until fluid has accumulated behind the sealing lip. Bubble formations are composed of minute globules averaging about 1/64 inch diameter and are substantially evenly spaced. It should be noted that the bore walls of hydraulic cylinders contain microscopic depressions or tool marks left from machining operations even where the bore surface is super-finished, and cavitation may be initiated by the passage of the sealing cup over these depressions producing low pressure voids resulting in the formation of bubbles of cold vapor from a film of fluid between the sealing cup and the bore wall. In conventional sealing cups in the past, this film of fluid was subjected to its highest pressure behind the cup lip whereby a venturi effect apparently resulted between this point and adjacent lower pressure seal contact and surface irregularities in the bore wall. Erosion of prior art seals has been found to occur in a zone spaced behind the sealing lip or point of maximum sealing contact and develops axially and radially so that the maximum sealing surface or edge is undermined and remains intact until the last stages whereby sudden sealing cup failure may occur although fluid loss has been increasing for some time. It is also believed that heavy cavitation produces loss of contact of the seal lip with the bore wall even before appreciable wear or erosion begins whereby heavy fluid leakage occurs.

Erosion from cavitation is markedly different from abrasive damage, the former beginning at a sharply defined distance behind the seal lip and the latter being evident from continuous scratches along the entire length of the sealing cup and across the lip. Furthermore, cavitation to some degree is believed to occur on all seals.

The principal object of the present invention is to provide a greatly improved sealing cup for reciprocable elements, which will minimize the cavitation problem and have a long, effective sealing life.

Another object is to provide a simple, economically manufactured sealing member having a predetermined length, shape and controlled maximum sealing contact for reducing fluid leakage and erosion of the member to a minimum.

Another object is to provide an improved seal having increased and controlled lip tension characteristics.

These and still other objects and advantages will become more apparent hereinatfer.

The invention is embodied in a sealing member of predetermined length having an annular sealing portion with a continuous sealing edge, and a supporting mass for the sealing edge to locate the maximum sealing tension of the sealing portion at the sealing edge, and the sealing portion having a reduced section spaced axially from the supporting mass beyond the plane of the sealing edge.

The invention also consists in the parts and in the combinations and arrangements of features, configurations and proportions of parts hereinafter described and claimed. In the accompanying drawing forming a part of this specification and wherein like numerals refer to like parts wherever they occur:

FIG. 1 is a cross-sectional view showing a sealing member embodying the invention in a typical hydraulic mechanism illustrated diagrammatically, FIG. 2 is a greatly enlarged fragmentary elevational view, partly in section, of the sealing member per se, FIG. 3 is a greatly enlarged fragmentary cross-sectional view of the sealing member mounted in a hydraulic device, and showing graphically the sealing effect, FIG. 4 is a view similar to FIG. 3 of a modified sealing member, and FIG. 5 is a view similar to FIG. 3 of a prior art sealing member and also showing graphically the sealing effect thereof.

Referring now to the drawings, a typical hydraulic mechanism with which a sealing cup 10 embodying the present invention is shown for purposes of disclosure is a slave cylinder 11 having a cylindrical bore 12 defined by a bore wall 13 and a port 14 connected by conduit 15 to a fluid pressure producing device (not shown) in a closed hydraulic system, such as a hydraulic clutch system. A piston member or plunger 16 is slidably positioned in the bore 12 and has a connecting rod 17 pivotally mounted thereon, as at 18. The rod 17 has a work producing end (not shown) connected mechanically to a device such as a clutch (not shown), and the piston 16 and rod 17 are actuated to the operative position shown in FIG. 1 by fluid pressure in the bore 12. Suitable return means, such as a spring (not shown), is provided for returning the piston and rod to an inoperative or retracted position adjacent to the port 14. In the return stroke of the piston 16, it is moved toward the pressure fluid source or port 14 and acts on the pressure fluid in the bore 12. It may be noted that in a slave cylinder 11, such as is illustrated as being employed in a clutch actuating system, the piston 16 has a relatively long stroke. The forward surface 19 of the piston member 16 seats the sealing cup 10 which engages the bore wall 13 to prevent leakage of hydraulic fluid past the piston 16. The sealing member 10 may be retained in surface engagement with the piston 16 in any desired manner to be reciprocated therewith. For instance, as shown in FIG. 4, the sealing cup 10 may include an inner annular flange 20 circumscribing and sealing against an axial piston extension 21 having a seal retainer 22 extending over the inner flange 20 for maintaining the seal in juxtaposition with the piston 16 during the return stroke thereof to retracted position. However, it is also apparent that the seal 10 will remain in contact with the piston surface 19 without holding means since the seal is subjected to pressure fluid in both the actuation and return strokes of the piston 16.

Referring to FIG. 5 wherein a typical prior art sealing cup S is shown for purposes of comparison with the present sealing member 10 and for illustrating the cavitation and wear problems more fully, it will be noted that the cup S has a long axial lip L tapering to an acute angle at its free or leading edge E. The bore wall B against which the cup S is sealingly engaged has miscroscopic tool marks T, which exist in all cylinder bores and appear to be responsible, in part, for the cavitation problem. The maximum sealing tension exerted by the cup S against the bore wall B occurs at a point spaced inwardly of the leading edge E of the cup lip L. In the return stroke of the piston P, to the right in FIG. 5, pressure fluid in the bore B acts on the cup lip and accumulates under the edge E. As the piston and cup move, a venturi effect is produced and the fluid is thinnest where the point of maximum tension occurs and then, as the tension decreases where surface irregularities such as tool marks occur, bubbles of cold vapor are formed and break thereby producing erosion or wear in an axial streak or streaks across the cup surface as is shown by the broken line W in FIG. 5. The erosion shown is in an advanced stage, and has worn forwardly toward the leading edge approximately to the point of maximum tension of the sealing lip L.

It has been discovered that cavitation and resultant erosion of a sealing cup can be minimized to extend sealing cup life and to reduce leakage of fluid to a negligible amount over extended periods of use. Referring to FIGS. 2 and 3, a sealing cup 10 embodying the present invention is formed of a typical resilient or flexible, but incompressible, material such as rubber. The sealing cup 10 has a base or mounting portion 25 in the shape of a circular disc having a surface 26 for abutment with the seal seating surface 19 of the piston 16. The sealing cup 10 also includes a sealing portion 27 connected to or formed integral with the mounting portion 25. The sealing portion 27 preferably has a tapering or radially outwardly flaring outer surface 28 having a sharply defined sealing edge or lip 29 at the free or leading end of the sealing portion 27. The shape of the sealing portion 27 is frusto-conical having its large base lying in a radial plane on which the sealing lip 29 is positioned. A supporting mass 30 for the sealing lip 29 is positioned radial- ly inwardly therefrom, and has a frusto-conical or convex end surface 31 extending in an axial direction or diagonally from the lip 29. The frusto-conical surface has its large base common with the large base of the frusto-conical outer surface 28 of the sealing portion 27.

A central cavity 32 is provided in the sealing portion 27 having a side wall surface 33 extending from the mounting portion 25 in a converging relation with the outer surface 28 of the sealing portion defining an annular wall 35 therebetween and providing a narrow wall section, at 34, at a point spaced axially toward the mounting portion from the radial plane of the sealing edge 29. The surface of the cavity 32 curves radially inwardly, at 36, and opens in an axial direction outwardly to define the radially inner surface 37 of the supporting mass or radial flange 30.

According to the present invention the axial dimension of the sealing cup 10 between the mounting portion surface 26 and the sealing edge 29 is shortened relative to prior art cup constructions and optimum length of sealing cups having a diameter up to about 1½ inches is 0.240 inch, but may vary between 0.230 and 0.260 inch. This shortened length is an important feature and may be designated as a predetermined length. The reduced section 34 is also important and, in addition, it should be noted that the outer surface 28 of the annular sealing portion 35 and the end surface 31 of the mass or annular flange 30 are formed at an obtuse angle which is an important feature. The angle of the end surface 31 relative to the plane of the large bases is shown in FIG. 2 to be approximately 30° before the seal 10 is inserted into the bore 12 of a cylinder 11. The angle formed between the surfaces 28 and 31 must be obtuse, but must be small enough to provide a sharply defined sealing edge 29. Preferably, the obtuse angle is between 100° and 120°.

The present sealing cup 10 has its maximum sealing tension developed at the lip 29, FIG. 3, and the formation of the underlying supporting mass 30 and its forwardly extending end surface 31 at an obtuse angle relative to the outer surface 28 of the rearwardly extending seal wall 35 acts to maintain the lip tension regardless of the presence or absence of fluid pressure in the bore 12. Accordingly, the tension of the sealing lip 29 against bore wall 13 maintains or wipes a clean surface and produces an improved sealing effect even with respect to the microscopic tool marks T thereby substantially preventing fluid leakage past the seal lip for long periods of operation. In the absence of a film of fluid behind the seal lip 29, the cavitation problem is overcome. However, even after extended use wears the cup 10, the formation of bubbles and consequent erosion is kept at a minimum.

It is now apparent that the present invention approaches the cavitation problem, which has been known to exist for sometime, in a positive manner and provides an improved result not suggested by the art.

The invention is intended to cover all changes and modifications of the sealing cup which will be apparent to one skilled in the art in view of the present disclosure and is limited only to the claims which follow.

What I claim is:

1. A sealing member comprising a mounting portion, an annular sealing portion of predetermined length having a continuous sealing edge defined by surfaces formed at an obtuse angle, and a supporting mass for the sealing edge to locate maximum sealing tension of the sealing portion at the sealing edge, the sealing portion having a reduced section spaced axially toward the mounting portion from the plane of the sealing edge.

2. A sealing member comprising a base portion, an axially-extending annular sealing portion of predetermined length connected with said base portion and having an outer sealing surface with a free end forming a continuous sealing edge, a radial flange formed on the free end of said sealing portion having an end surface at an obtuse angle relative to the outer surface of said sealing portion and providing a seal mass supporting said sealing edge, said sealing portion having a reduced section axially spaced toward the base portion from the plane of said sealing edge.

3. A sealing member comprising a base portion having a seal seating surface, an axially-extending annular sealing portion connected with said base portion and having an outer sealing surface with a free end forming a continuous radially disposed sealing edge, said sealing edge being located a short predetermined distance from said seating surface, a radial flange formed on the free end of said sealing portion having an end surface formed at an obtuse angle relative to the outer surface of said sealing portion and providing a seal mass supporting said sealing edge, said sealing portion having a reduced section axially spaced toward the base portion from the radial plane of said sealing edge.

4. A sealing member comprising a base portion, an axially-extending annular sealing portion connected with said base portion and having an outer sealing surface with a continuous radially disposed sealing edge formed a predetermined axial extent from said base portion, a radial flange extending inwardly from the sealing edge and having an end surface extending diagonally from said sealing edge away from said sealing portion at an obtuse angle relative to the outer surface thereof, said radial flange providing a seal mass locating maximum sealing tension at said sealing edge, said sealing portion having a reduced section axially spaced toward the base portion from the radial plane of said sealing edge.

5. In a device of the type described including a cylinder having a piston therein actuated to an operable position by hydraulic fluid pressure from a pressure producing source and returned to an inoperable position toward the pressure fluid source, a sealing member mounted on the piston and having an annular sealing portion extending away from the piston toward the pressure fluid source, said sealing portion having a radial sealing edge a predetermined axial distance from the piston, and means supporting said sealing edge and providing maximum sealing tension of said sealing portion on said sealing edge, said supporting means including a radial flange formed at an obtuse angle with said sealing portion and extending axially on both sides of the plane of said sealing edge.

6. A sealing member for insertion in a cylindrical bore of a housing at one end of a reciprocable member, comprising a mounting portion for positioning the sealing member on the end of the reciprocable member, and a bore-engaging portion connected with said mounting portion for sealed engagement with the bore of the housing, said bore-engaging portion extending in an axial direction from said mounting portion a predetermined distance and having an outwardly flaring outer surface of substantially frusto-conical shape forming a sealing edges of maximum sealing tension in the radial plane of the large base of the frusto-conical outer surface, said bore-engaging portion including a frusto-conical free end formed opposite to the mounting portion and having a large base common with the large base of the frusto-conical outer surface, the free end surface being formed at an obtuse angle relative to the outer surface of said bore-engaging portion, said bore-engaging portion and frusto-conical free end thereon having a central cavity with a surface extending axially and radially outwardly from the mounting portion in converging relation with said outer surface to form an annular seal wall having a point of reduced cross-section spaced axially toward the mounting portion from the plane of the common large bases of said bore-engaging portion and frusto-conical free end, said cavity surface extending radially inwardly from the point of reduced cross-section and defining an enlarged seal mass radially inwardly of said sealing edge and extending axially outwardly of the plane of the large bases of said bore-engaging portion and frusto-conical free end.

7. A sealing member comprising a base, an annular sealing portion having a continuous sealing lip, and an enlarged seal mass formed on the end of said sealing portion and extending inwardly of and axially beyond said sealing lip for locating maximum outward sealing tension substantially at the sealing lip.

8. A sealing member comprising a base, an annular sealing portion having a continuous sealing edge, and an enlarged supporting mass formed at an obtuse angle relative to said sealing portion and locating maximum sealing tension of the sealing portion substantially at the sealing edge.

9. A sealing member comprising a base, an annular sealing portion of predetermined length having a continuous sealing edge defined by surfaces formed at an obtuse angle, and a supporting mass for the sealing edge to locate maximum sealing tension of the sealing portion substantially at the sealing edge, the sealing portion having a reduced section adjacent to the radial plane of the sealing edge.

10. In a fluid pressure device including a cylinder having a piston slidable therein in response to fluid pressure, and a sealing member mounted in sealing relation between said piston and cylinder comprising an annular base portion, an annular sealing portion extending from said base portion and having an outer cylinder wiping surface, and an enlarged supporting mass on said sealing portion, said mass extending beyond said sealing portion and locating the maximum outward sealing tension between said sealing portion and said cylinder at a predetermined point on said cylinder wiping surface.

11. In a fluid pressure device including a cylinder having a piston slidable therein in response to fluid pressures, a sealing member mounted on the piston and including an annular sealing portion having a continuous sealing lip a predetermined axial distance from said piston, and a supporting mass on said sealing portion, said mass having a portion thereof enlarged relative to said sealing portion and extending beyond said sealing lip to exert an outward force locating the maximum sealing tension between said sealing portion and said cylinder substantially at said sealing lip thereby minimizing cavitation and wear of said sealing member.

12. In a fluid pressure device including a cylinder having a piston therein actuated to an operable position by fluid pressure from a pressure producing source and returned to an inoperable position toward the pressure fluid source, a sealing member mounted on the piston and having an annular sealing portion extending away from the piston toward the pressure fluid source, said sealing portion having a continuous sealing edge positioned in a radial plane a predetermined axial distance from the piston, and a flange formed at an obtuse angle with said sealing portion and providing an enlarged supporting mass developing maximum sealing tension substantially at said sealing edge whereby the occurrence of cavitation and resulting wear of the outer sealing portion surface is minimized.

13. A sealing member comprising a base, an annular sealing portion having a continuous sealing edge, and an enlarged supporting mass extending axially beyond said sealing edge to provide maximum sealing tension of the sealing portion substantially at the sealing edge.

14. A sealing member comprising a base, an annular sealing portion having a continuous sealing edge, and flange means formed integral with said sealing portion and extending from said sealing edge to locate maximum sealing tension substantially at said sealing edge.

15. A sealing member adapted to be slidably positioned in a cylinder and subject to fluid pressures, said member comprising a base, an annular sealing portion extending from said base, a continuous edge on said sealing portion, and means integrally formed on said sealing member for minimizing cavitation by pressure fluid on the outer surface of said sealing portion.

16. A seal providing a slidable sealing engagement with a cylinder wall for association with a piston reciprocable in the cylinder to prevent loss of fluid between the piston and the cylinder, comprising an annular sealing member of resilient material having a surface at one end thereof for engagement with an end of a piston for support thereon, said member having a recess extending inwardly thereof from the opposite end of the member and forming a cup-shaped member having a bottom wall portion and an annular side wall portion, said member having a circumferential knife-edged lip on the outer periphery of said side wall portion adjacent said opposite end and disposed axially inwardly of said opposite end and being sealingly engageable with a cylinder wall, and means integral with said side wall for locating maximum sealing tension substantially at said knife-edged lip and minimizing cavitation on the outer periphery of said side wall.

References Cited in the file of this patent
UNITED STATES PATENTS 2,884,291     Whitten _____ Apr. 28, 1959